No. 843,345. PATENTED FEB. 5, 1907.
W. H. LYTLE.
CORN PLANTER.
APPLICATION FILED JUNE 28, 1906.
4 SHEETS—SHEET 4.
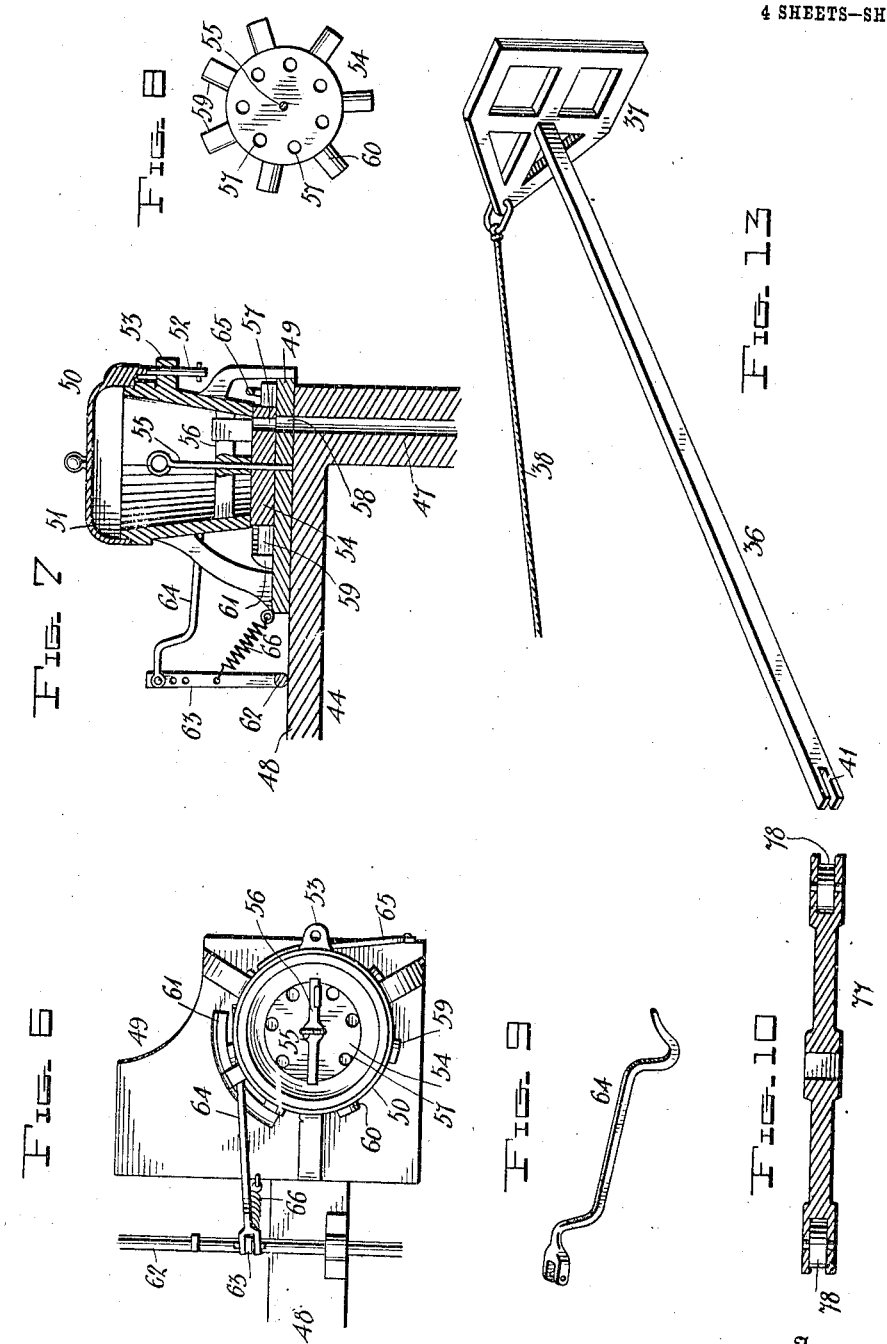
Witnesses
Inventor
William H. Lytle
by
Attorneys

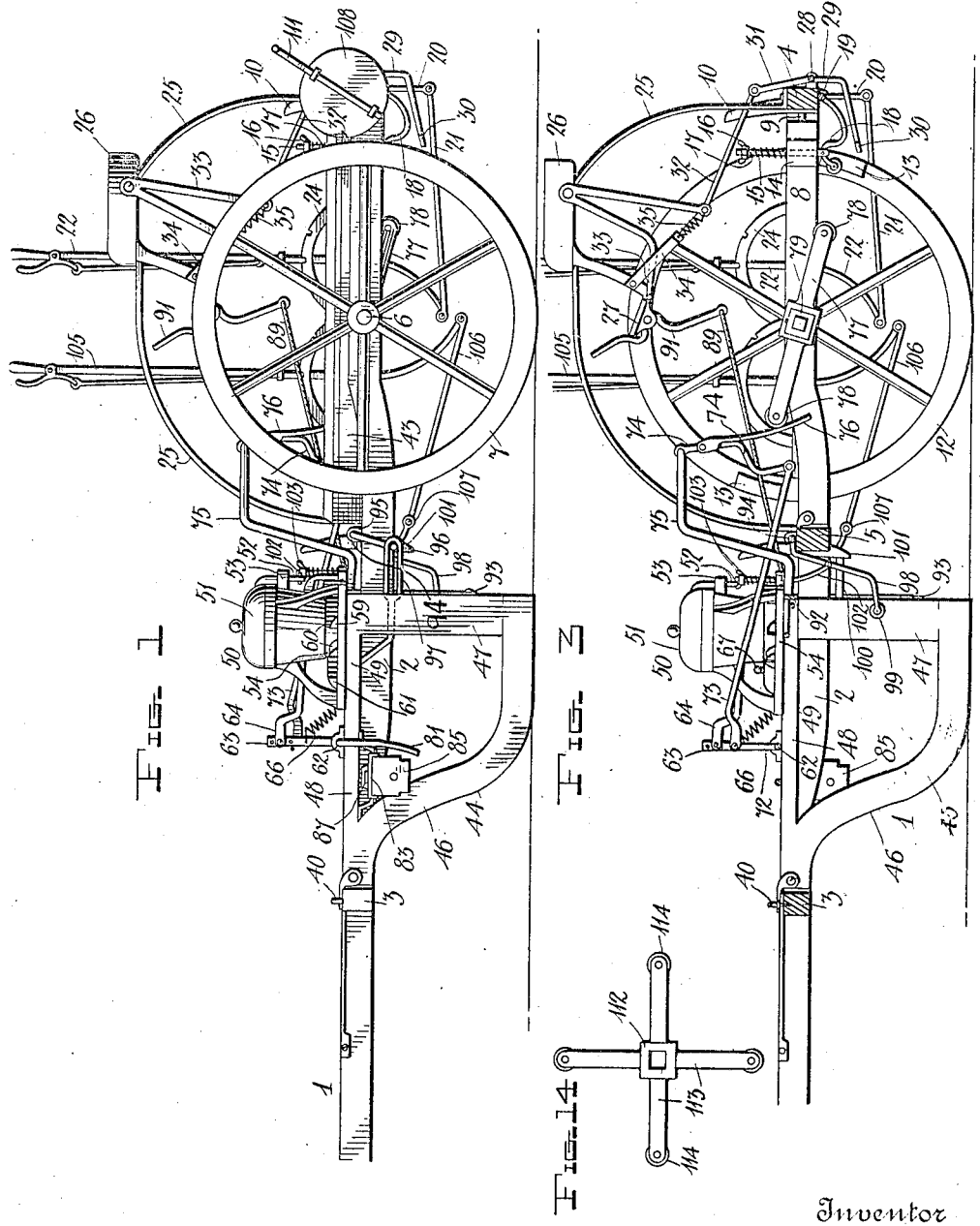

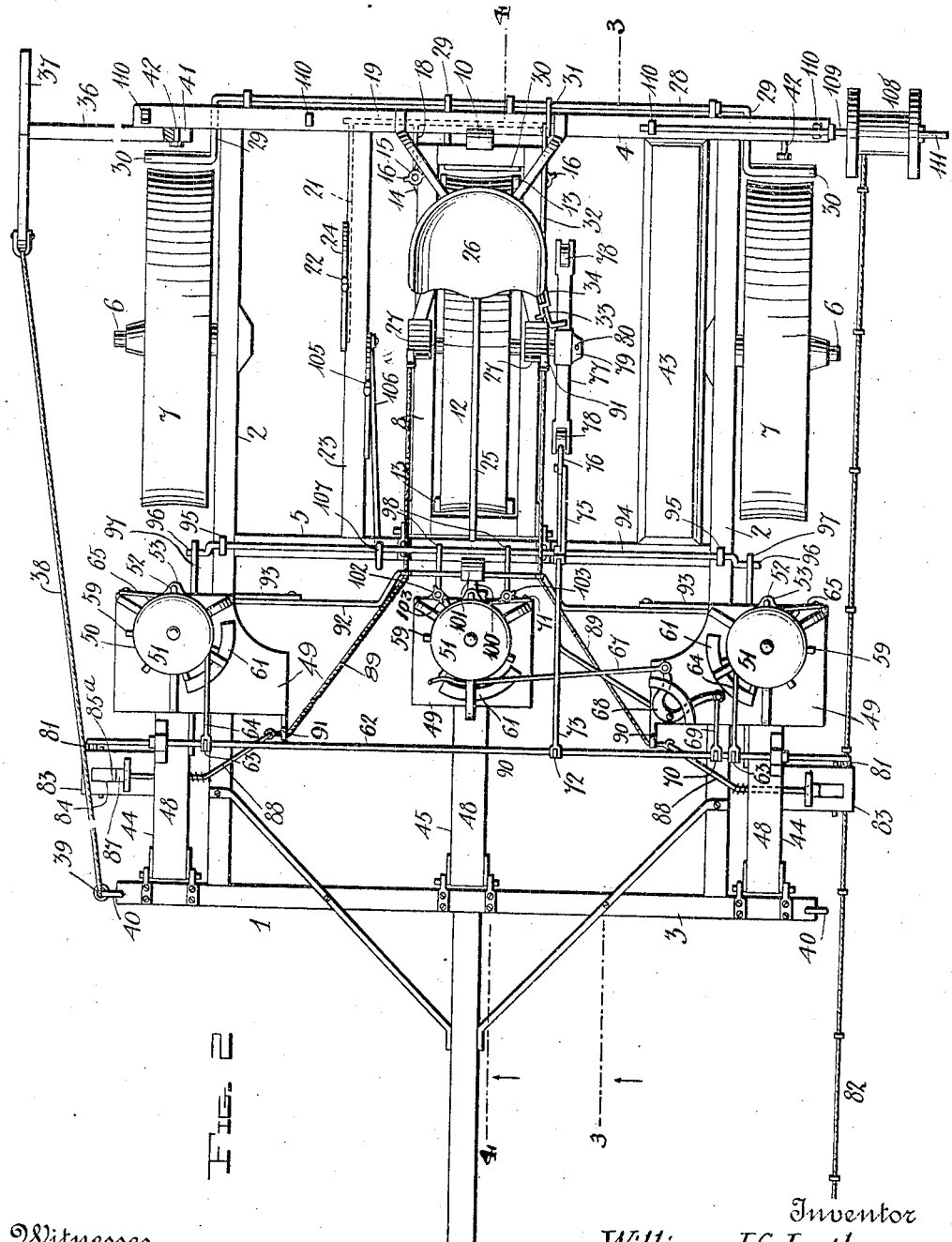

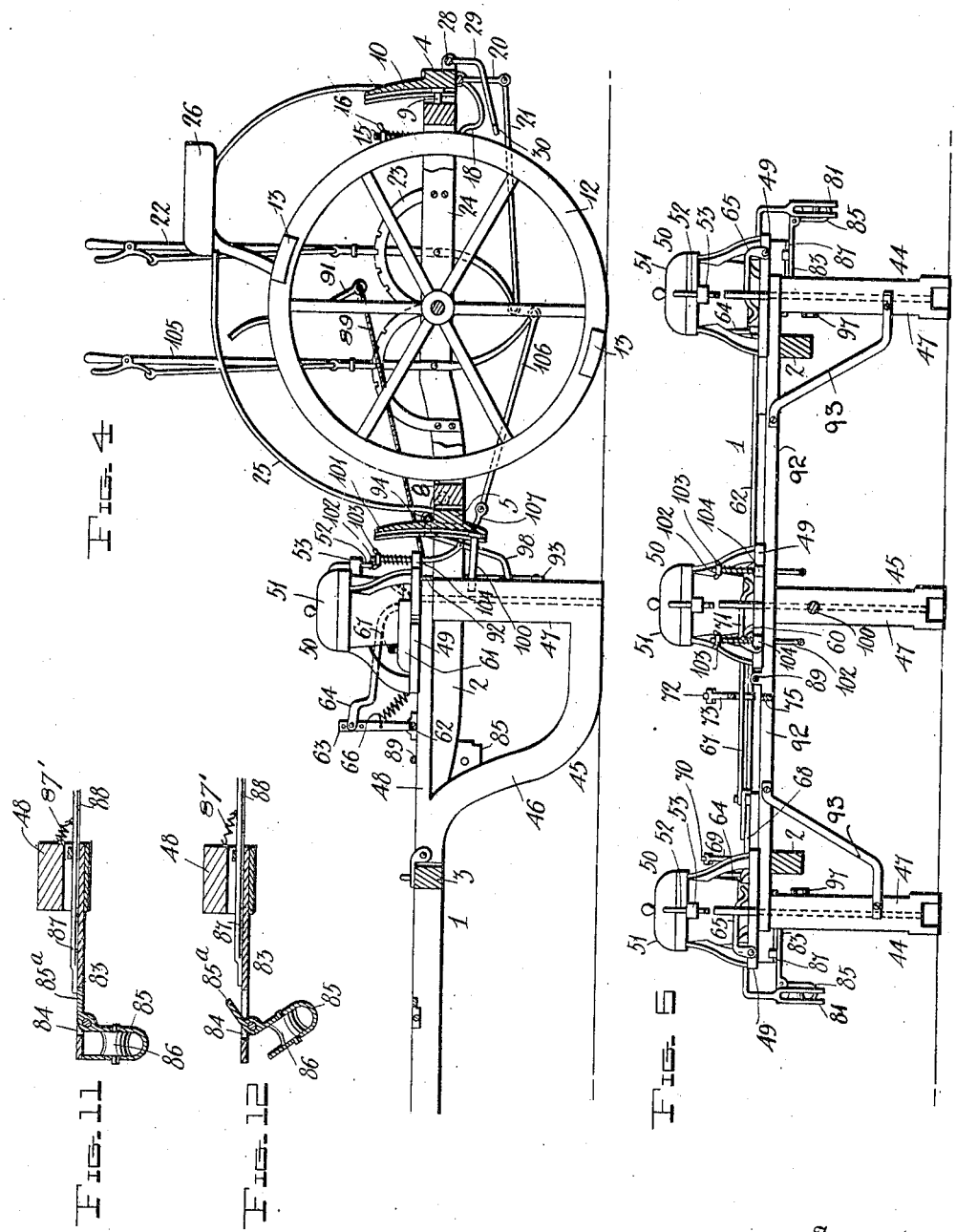

UNITED STATES PATENT OFFICE.

WILLIAM H. LYTLE, OF BEDFORD, ILLINOIS, ASSIGNOR OF ONE-HALF TO W. R. DONOHOO, OF PEARL, ILLINOIS.

CORN-PLANTER.

No. 843,345.    Specification of Letters Patent.    Patented Feb. 5, 1907.

Application filed June 28, 1906. Serial No. 323,802.

*To all whom it may concern:*

Be it known that I, WILLIAM H. LYTLE, a citizen of the United States, residing at Bedford, in the county of Pike and State of Illinois, have invented certain new and useful Improvements in Corn-Planters; and I do declare the following to be a full, clear, and exact description of the invention, such as will enable others skilled in the art to which it appertains, to make and use the same.

This invention relates to improvements in corn-planters.

The object of the invention is to provide a machine of this character having means whereby the seed-dropping mechanism may be operated automatically from the running gear or by means of a check-line.

Another object is to provide a corn-planter constructed and arranged for planting three rows of corn at a time, means being also provided whereby the operating mechanism may be changed from check-feed to a drill-feed, so that the corn or seed may be drilled into the furrow.

With the above and other objects in view the invention consists of certain novel features of construction, combination, and arrangement of parts, as will be hereinafter described and claimed.

In the accompanying drawings, Figure 1 is a side view of a corn-planter constructed in accordance with the invention. Fig. 2 is a plan view of the same. Fig. 3 is a vertical longitudinal sectional view through the planter, taken on the line 3 3 of Fig. 2. Fig. 4 is a similar view taken on the line 4 4 of Fig. 2. Fig. 5 is a vertical cross-sectional view taken in rear of the seed-hoppers and looking toward the same. Fig. 6 is an enlarged detail plan view of one of the seed-hoppers and its operating mechanism with the cover of the hopper removed. Fig. 7 is a vertical sectional view of the same and the seed-conducting tube. Fig. 8 is a detail plan view of one of the seed disks or valves. Fig. 9 is a detail perspective view of one of the operating-pawls for the side feed-valves. Fig. 10 is a sectional detail view of a tappet-lever used in connection with the apparatus. Fig. 11 is an enlarged detail sectional view of one of the check-line carriers and wire doffers, showing the same locked in position for use. Fig. 12 is a similar view showing the parts of the wire doffers released and in position to disengage the check-wire. Fig. 13 is a detail view of the marking-staff, and Fig. 14 is a detail side view of the drill-feed mechanism.

Referring more particularly to the drawings, 1 denotes the main supporting-frame, having longitudinally-disposed side bars 2 connected at their ends by a front cross-bar 3 and a rear cross-bar 4. Substantially midway between the ends of the bars 2 is arranged an intermediate cross-bar 5. On the side bars 2, near the rear ends of the same, are arranged stub-shafts 6, on which are journaled supporting-wheels 7. Between the rear cross-bar 4 and the intermediate cross-bar 5 and hingedly connected to the latter is a marking-wheel frame 8, on the rear end of which is formed a rearwardly-projecting guide-stud 9, which is slidably mounted in a segmental guide-passage formed in a guide lug or arm 10, arranged on the rear cross-bar, as shown.

Journaled in the frame 8 is a marking-wheel 12, in the periphery of which, at diametrically opposite points, are arranged marking-blocks 13, by means of which the hills of corn are marked. The frame 8 is provided on each side adjacent to its rear end with apertured ears or lugs 14, through which are adapted to project upwardly-extending pressure-rods 15. On the upper threaded ends of the rods 15 are screwed thumb-nuts 16, between which and the lugs 14 is arranged a coil-spring 17, the tension of which is exerted to force the frame 8 downwardly to hold the marker-wheel therein into engagement with the ground. The lower ends of the rods 15 are pivotally connected to upwardly-curved crank-arms 18, arranged on a shaft 19, journaled in bearings on the under side of the rear cross-bar 4 of the frame. To the shaft 19 is also connected a downwardly-projecting crank-arm 20, to the lower end of which is connected a link 21, the opposite end of which is connected to the lower end of a lifting-lever 22, pivotally mounted on a bar 23, arranged between the rear cross-bar 4 and the intermediate bar 5 of the planter-frame. The lever 22 is provided with the usual pawl, adapted to be engaged with a segmental rack 24, whereby when the latter is pulled rearwardly the shaft 19 will be rocked in the proper direction to cause the crank-arms 18 to swing the frame 8 and the marking-wheel therein upwardly, so that the latter will be out of engagement with the ground. When the lever 22 is pushed forwardly, the shaft 19 will be turned in the proper direction to cause the crank-arm 18 to pull downwardly on the rods 15, thus causing the springs 17 to yieldingly force or hold the marking-wheel into engagement with the ground.

Connected to the intermediate cross-bar 5 and the rear cross-bar 4 is an upwardly-curved seat-supporting frame 25, on which is arranged a driver's seat 26, said seat being arranged immediately above the marking-wheel 12. To the seat 26 is connected foot-rests 27, which project downwardly on each side of the marking-wheel, as shown. Pivotally mounted upon the rear cross-bar of the frame is a scraper-shaft 28, on the ends and at the center of which are arranged downwardly and forwardly projecting crank-arms 29. On the lower ends of the arms 29 are formed right-angularly-projecting scraper-blades 30, adapted to be brought into engagement with the peripheries of the supporting-wheel 7 and the marking-wheel 12 to scrape and clean the same. The shaft 28 is provided with an upwardly-projecting crank-arm 31, adjustably connected, by means of a link 32, to the lower end of a substantially V-shaped foot-lever 33, pivotally mounted on one side of the driver's seat, as shown. One end of the lever 33 projects through and works in a guide-bracket 34 and has formed on its outer end a foot-piece which is arranged in convenient position beside one of the foot-supports of the seat, as shown, whereby said lever may be readily operated by the foot of the driver. The opposite arm of the lever 33 is connected by a coil-spring 35 with the lower end of the guide-bracket 34, whereby when the lever is released by the driver the same will be restored to its normal position, thereby disengaging the scrapers from the wheels, as will be understood.

Adapted to be connected to one end or the other of the rear cross-bar 4 is a marker-staff 36, on the outer end of which is arranged a marking frame or runner 37, having its forward end inclined from each side toward the center, as shown. To the forward pointed end of the marking frame or runner is connected a rope 38, the forward end of which is connected by a link 39 to a hook 40 on the end of the front cross-bar 3 of the frame 1. The marker-staff 36 has formed in its inner end a short longitudinally-disposed slot 41, which is adapted to be engaged with a headed stud 42, arranged on the inner side of the projecting end of the rear cross-bar, whereby said staff may be quickly connected and disconnected from the frame to permit the same to be moved from one side of the planter to the other, as will be understood. If desired, a suitable tool-box 43 may be arranged in the rear portion of the frame 1, adjacent to one of the side bars 2, and extend between the intermediate and rear cross-bar, as shown.

Hingedly connected to the projecting ends of the front cross-bar 3 are side planter shoes or runners 44, while between the side bars 2 is hingedly connected to the front cross-bar an intermediate planter shoe or runner 45. The shoes or runners 44 and 45 may be of the usual or any suitable construction and are here shown as having upwardly-curved forwardly-projecting furrow-opening blades 46, to the rear ends of which are connected vertically-disposed seed-discharging-tubes 47, connected at their upper ends to the forward upper ends of the blades 46 by longitudinal bars or plates 48. On the bars or plates 48 of the planter-shoes are arranged hopper-supporting plates 49, above which and supported thereon by curved supporting-legs are seed-hoppers 50. The hoppers 50 are preferably closed on their upper ends by caps or covers 51, which are preferably attached to the hoppers by means of downwardly-projecting rods 52, secured at their upper ends to one side of the cap and projecting downwardly through apertured lugs 53 on the hoppers, said rods having in their lower ends a transversely-disposed cotter pin or key, which will prevent the withdrawal of said rods from the apertured lugs on the hoppers, thereby connecting the caps or covers to the hoppers and serving as a pivot upon which said covers may be swung to one side after being lifted from the top of the hoppers.

Beneath the hoppers 50 on the plates 49 are arranged feed valves or disks 54, said valves being pivotally mounted upon vertically-disposed pins 55, which are arranged in a cross-bar 56 in said hoppers and project into the plates 49 below the same. The valves 54 are preferably in the form of circular plates, in which adjacent to their outer edges is formed an annular series of feed-apertures 57, which are adapted to be consecutively brought over a discharge-passage 58, formed in the hopper-plate 49 and communicating with the feed-tube 47, arranged beneath the same. On the edges of the valves 54 are a series of radially-projecting lugs or teeth 59, the upper sides of which are beveled or inclined in one direction, as shown at 60. On the hopper-plates 49, adjacent to the outer ends of the teeth or lugs 59, is arranged a segmental guard-flange 61, the purpose of which will hereinafter appear.

Journaled in bearings on the upper cross-bars 48 of the shoes or runners is a transversely-disposed valve-operating shaft 62, on which opposite to each side hopper is formed an upwardly-projecting crank-arm 63, in which is formed a series of apertures, by means of which a valve-operating pawl 64 is adjustably connected thereto. The free end of said pawl is constructed in the form of a hook, as shown, to consecutively engage the teeth or lugs 59 on the valves 54 to turn said valves when the operating-shaft 62 is oscillated. The hooked ends of the pawl 64 are adapted to slide loosely over the inclined or beveled surface 60 of the lugs 59 when projected rearwardly and to engage the squared side of the teeth, and thereby turn said valves when retracted forwardly by the operating-shaft. The valves 54 are held against a retrograde movement by means of stop pawls or detents 65, which are pivotally mounted to the rear sides of the plates 49 and are adapted to slide loosely over the beveled surface of the lugs 60 when the valve is turned in one direction and to drop behind each successive lug, thereby preventing any backward movement of the valve. The operating-shaft 62 is oscillated in a forward direction to turn the feed-valves by any suitable mechanism, hereinafter to be described, said shaft being turned back or restored to its normal position after each operation of the valves by means of coil-springs 66, connected to the crank-arm 63 and to the hopper-plates, as shown. The feed-valve of the central or intermediate hopper is operated by means of a pawl 67, similar in construction to the pawls 64, except that the pawl 67 is provided with an elongated stem or shank, which extends from the central hopper to the front of one of the side hopper-plates, where the same is pivotally connected to one arm of a bell-crank lever 68, pivotally mounted upon said side hopper-plate. The opposite arm of said bell-crank lever is pivotally and adjustably connected by a link 69 to a crank-arm 70 on the operating-shaft 62, whereby the valve of the central hopper is operated simultaneously with the valves in the side hoppers. The valve in the central hopper is provided with a stop pawl or detent 71, similar in arrangement and construction to the side stop-pawls 65.

On the shaft 62 is formed an upwardly-projecting crank-arm 72, which is connected, by means of a link 73, to a tappet-arm 74. The arm 74 is pivotally connected at its upper end to a supporting-bracket 75, secured to the framework of the planter-shoes. The tappet-arm 74 is provided with a pivotally-mounted curved bearing-bar 76, which is held in the path of movement of a tappet-lever 77, adapted to be removably connected to the projecting end of the marking-wheel shaft, whereby when said wheel and shaft are turned the ends of said tappet-lever will be brought into successive engagement with the bearing-bar 76, thereby swinging the same and the tappet-arm 74 forwardly and rocking the operating-shaft 62 forwardly against the tension of the springs 66, and thus actuating the valve-operating mechanism, as hereinbefore described. The opposite ends of the tappet-lever 77 are preferably bifurcated, and in said bifurcated ends are journaled bearing-rollers 78, which provide for an antifrictional engagement of the ends of said lever with the bearing-bar 76 on the tappet-arm 74. The lever 77 may be removably connected to the end of the marking-wheel shaft in any suitable manner, said connection being here shown, and is preferably made by squaring the end of said shaft to fit a squared opening in the lever, which after being slipped on said squared end of the shaft is held thereon by means of a squared washer 79, in which and the end of the shaft are formed alined apertures to receive a locking pin or key 80.

If desired, the tappet-lever 77 may be removed from the shaft of the marking-wheel and the machine transformed into a check-row-planter. To provide for the operation of the valve mechanism when the machine is used for a checkrow-planter, the ends of the operating-shaft 62 are provided with downwardly projecting bifurcated crank-arms 81, which are adapted to be engaged by knobs on a check-line 82 and to be rocked or turned by the checks thereon. In order to support the check-line in position to engage the crank-arms 81, a suitable supporting mechanism is provided. Said mechanism is here shown and preferably consists of a laterally-projecting supporting-bracket 83, secured to the under side of the upper bars 48 of the two side planting shoes or runners 44. In the outer ends of the plates or brackets 83 is formed a slot 84, and pivotally mounted on the under side of said brackets or plate are guide-roller frames 85, in which are journaled guide-rollers 86, over which the check-line is adapted to pass. The roller-frames 85 are open at their upper ends, and the inner side of said frames are provided with inwardly-projecting lugs 85$^a$, which are adapted to work through the slots 84 and to be engaged by latch-bars 87, by means of which the pivoted roller-frames are held in a vertical or operative position. The open upper ends of said frames when in said operative position are closed against the under side of the plates or brackets 83, thus providing a guide-passage above the rollers, through which the check-line may pass and be supported in position to engage the bifurcated crank-arms 81 on the operating-shaft. In order that the check-line may be disengaged from the guide-rollers and frames, the latch-bars 87 are provided on their inner ends with inwardly-projecting stems 88, to the ends of which are connected releasing-cords 89. The cords 89 pass through suitable guide-brackets 90 and are connected at their opposite ends to a foot-lever 91, pivotally mounted on the under side of each of the foot-rests 27 on the driver's seat, whereby when said foot-levers are depressed the latch-bars will be retracted, thus permitting the roller-frames to swing downwardly, thereby disengaging the upper outer ends of the same from the brackets 83 and permitting the check-line to leave the same. The latch-bars 87 are restored to their normal positions and held in engagement with the lugs 85ª of the roller-frames 85 by means of coiled springs 87', as shown.

The side planter shoes or runners are connected together at their upper ends by a transversely-disposed connecting-bar 92, said runners being braced to said connecting-bar by braces 93. In order that the planter shoes or runners may be swung upwardly out of engagement with the ground, a lifting mechanism is provided therefor, said mechanism being here shown, and preferably consists of a transversely-disposed crank-shaft 94, journaled in bearings 95 on the intermediate cross-bar 5 of the planter-frame. On the ends of the crank-shaft 94 are formed downwardly-projecting cranks 96, the laterally-projecting lower ends of which are adapted to be engaged with rearwardly-projecting slotted bearing-bars 97, secured to the inner sides of the side planter shoes or runners, as shown, whereby when said crank-shaft is turned in the proper direction the crank-arms will swing the side planter shoes or runner upwardly out of engagement with the ground. The crank-shaft 94 is provided adjacent to each side of the intermediate runner or shoe with downwardly and forwardly curved crank-arms 98, on the outer ends of which are journaled bearing-rollers 99, adapted to be brought into engagement with the under side of the hopper-plate on the intermediate shoe or runner, thereby raising or swinging said shoe upwardly when said crank-shaft is turned in the proper direction. The inner side of the seed-tube of the intermediate shoe or runner is provided with a rearwardly-projecting guide-lug 100, which is adapted to slidably engage a slotted segmental guide-bracket 101, secured to the forward side of the intermediate cross-bar 5 of the planter-frame, thereby causing said intermediate planter shoe or runner to move upwardly and downwardly in a true or perpendicular plane when raised by the crank-arms 98 on the shaft 94.

Pivotally connected to the crank-arms 98 are upwardly-projecting pressure-rods 102, on the threaded upper ends of which are adapted to be screwed tension-nuts 103, between which and apertured ears or lugs 104 on the hopper plate of the intermediate shoe, through which said pressure-rods pass, thereby forcing and yieldingly holding the intermediate runner or shoe down into engagement with the ground. The crank-shaft 94 is rocked or oscillated by means of an operating-lever 105, pivotally mounted on the connecting-bar 23 of the frame 1, said lever being connected at its lower end by means of a link 106 to a downwardly-projecting rearwardly-curved arm 107, arranged on the crank-shaft, as shown. The lever 105 is provided with the usual pawl-and-ratchet adjustment for holding the same and the parts controlled thereby in their raised or lowered position.

When the feed mechanism of the planter is operated by means of a check-line, the latter is preferably arranged upon a reel or winding-spool 108, which is fixedly mounted on the end of a shaft 109, journaled in suitable bearings 110 on the rear cross-bar 4 of the planter-frame. Said reel is provided with a crank-handle 111, by means of which the check-line may be rewound thereon after being used.

In order to change the movement of the seed-valves from a check to a drill feed, a suitable drill-feed mechanism is provided to take the place of the tappet-lever. Said mechanism is here shown and preferably consists of a hub 112, having a squared aperture, whereby the same is adapted to be engaged with the squared end of the marking-wheel shaft after the tappet-lever has been removed therefrom. The hub 112 is provided with a series of four or more radially-projecting arms 113, in the outer ends of each of which is journaled a bearing-roller 114, said rollers being adapted to be brought into successive engagement with the bearing-bar 76 on the tappet-arm 74, thereby imparting a rapid movement to said tappet-arm and its connections with the valve-operating shaft, which rapid movement is thereby imparted to the valves to cause the latter to produce practically a continuous feed of seed from the hoppers.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters Patent, is—

1. In a planter, the combination with a wheeled supporting-frame, of a marker-wheel loosely mounted therein, a series of runner-shoes hingedly connected to said frame, feed-hoppers carried by said shoes, feed-valves mounted within said hoppers, radially-projecting lugs on said valves, a cranked, spring-retracted, valve-operating shaft mounted on said runners, pawls actuated by said shaft to engage the lugs on said valves and turn the latter, a tappet-arm connected to said shaft, and means actuated by said marker-wheel to engage said tappet-arm and thereby rock said valve-operating shaft, substantially as described.

2. In a corn-planter, the combination with a wheeled supporting-frame, of a marking-wheel frame hingedly mounted therein, a marking-wheel journaled in said hinged frame, a series of shoes hingedly mounted in the forward portion of said wheeled frame, apertured hopper-plates arranged on said shoes, seed-hoppers arranged above said plates, apertured feed-valves pivotally mounted between said hoppers and said plates whereby communication is formed between said hopper and the feed-tubes of said shoes, a series of radially-disposed lugs on each of said valves, a spring-retracted valve-operating shaft journaled on said shoes, valve-operating pawls adapted to be reciprocated by said operating-shaft to successively engage the teeth on said valves and thereby revolve the same, stop-pawls on said hopper-plates to prevent the retrograde motion of said valve, and means whereby said operating-shaft is actuated, substantially as described.

3. In a corn-planter, the combination with a wheeled supporting-frame, of a marking-wheel frame hingedly mounted therein, a marking-wheel journaled in said hinged frame, means to raise and lower said marking-wheel out of and into engagement with the ground, a series of runner-shoes hingedly connected to said wheeled frame, means to raise and lower said shoes out of and into engagement with the ground, hoppers carried by said shoes, rotary feed-valves disposed within said hoppers, a valve-operating shaft journaled on said shoes, valve-operating pawls connected to and operated by said shaft to turn said valve in one direction, stop-pawls operating to prevent a retrograde movement of said valves, and means whereby said operating-shaft is actuated by said marking-wheel, substantially as described.

4. In a corn-planter, the combination with a wheeled supporting-frame, of a marking-wheel frame hingedly mounted therein, a marking-wheel journaled in said hinged frame, a lifting-lever to raise and lower said marker-frame and wheel, runner-shoes hingedly connected to said wheeled frame, seed-hoppers carried by said shoes, rotary feed-valves arranged within said hoppers, a spring-retracted valve-operating shaft, valve-operating pawls actuated by said shaft to engage and turn said valves in one direction, means to prevent a retrograde movement of said valves, a tappet-arm connected to said operating-shaft and a tappet-lever mounted on the shaft of said marking-wheel and adapted to engage said tappet-arm and thereby actuate said valve-operating shaft, substantially as described.

5. In a corn-planter, the combination with a wheeled supporting-frame, of a marking-wheel frame hingedly mounted therein, a marking-wheel journaled in said frame, marking-blocks on said wheel, a lifting-lever to raise and lower said frame and wheel, cleaning-blades supported on the rear end of said wheeled frame, means to engage said blades with the peripheries of said wheel, runner-shoes hingedly connected to the forward end of said wheeled frame, feed-hoppers carried by said shoes, feed-valves arranged below said hoppers, an operating-shaft journaled on said shoes, a tappet-lever, means whereby said tappet-lever is adapted to actuate said shaft.

6. In a corn-planter, the combination with a wheeled supporting-frame, of a marking-wheel frame hingedly connected thereto, a marking-wheel journaled in said hinged frame, marking-blocks arranged in the periphery of said wheel, a lifting-lever adapted to raise and lower said frame and wheel, means to press and hold the latter downwardly in yielding engagement with the ground, a series of runner-shoes hingedly connected to the forward end of said frame, a lifting-lever to raise and lower said runner-shoes out of and into engagement with the ground, means to yieldingly press and hold said shoes downwardly on the ground, seed-hoppers arranged on said seed-planting shoes, rotary valves arranged below said hoppers, an operating-shaft journaled on said shoes, valve-actuating pawls operated by said shaft, a tappet-arm, a crank-arm arranged on said operating-shaft, a link connecting said crank-arm and tappet-arm, a pivotally-mounted bearing-plate on said tappet-arm, a tappet-lever removably mounted on the shaft of said marking-wheel, tappet-rollers mounted in the outer ends of said shaft to engage said bearing-plate, whereby a drilling movement is imparted to said feed-valve, substantially as described.

In testimony whereof I have hereunto set my hand in presence of two subscribing witnesses.

WILLIAM H. LYTLE.

Witnesses:
ARTHUR MILLER,
A. F. BORUD.